United States Patent Office 2,842,481
Patented July 8, 1958

2,842,481

PROCESS FOR PRODUCING OLEANDOMYCIN

Edwin J. Ratajak, Roslyn, and Robert C. Nubel, Levittown, N. Y., assignors to Chas. Pfizer & Co., Inc., Brooklyn, N. Y., a corporation of Delaware No Drawing. Application March 12, 1957
Serial No. 645,420

6 Claims. (Cl. 195—114)

This invention relates to a new and improved method for the production of oleandomycin whereby the yield of product is increased and the costs of production are reduced. In particlular, it is concerned with the production of oleandomycin by fermenting a nutrient medium with an oleandomycin-producing microorganism of the genus Streptomyces, whereby the antibiotic is produced in substantially increased yields by the inclusion of an organic dye.

It is also within the scope of the present invention to provide a culture medium in which this antibiotic may be more effectively produced. It is a further object of this invention to provide a fermentation medium in which an organic dye is introduced which will cause an increase in the amount of oleandomycin elaborated. The improvement of this process comprises conducting the fermentation in the presence of an organic dye chosen from the group consisting of the acid salts of 2,8-di(dimethylamino) acridine, the acid salts of 2,8-di(dimethylamino) xanthydrol, and a mixture comprising the acid salts of 2,8-diaminoacridine and 2,8-diamino-10-methylacridinium chloride.

Oleandomycin is an antibiotic (commercially available from Chas. Pfizer & Co., Inc., under the trademark, "Matromycin") formed during the cultivation under controlled conditions of a strain of a species of microorganism known as *Streptomyces antibioticus*. This process is described by B. A. Sobin, J. B. Routien and T. M. Lees in U. S. Patent No. 2,757,123, issued on July 31, 1956. It is to be understood that for the production of oleandomycin the present invention is not limited to any particular organism, but it is intended to include the use of variants of any new strain of this species as well as any mutuants produced from the described organism by various means, such as X-radiation, ultraviolet radiation, and the like.

The previous invention included the use of a fermentation medium which gave good yields of oleandomycin, but the improved process of the present invention affords the desired product in greatly increased yields, and the process is thereby rendered so much more efficient than that known in the prior art. The data accumulated reveals that a medium which contains the dyes described herein never has exhibited a potency increase of less than 10% despite the introduction of many experimental variables. The organic dyes which are suitable for the process of this invention are acid salts of organic bases selected from the class consisting of 2,8-di(dimethylamino) acridine, 2,8-di(dimethylamino) xanthydrol, and a mixture comprising the acid salts of 2,8-diaminoacridine and 2,8-diamino-10-methylacridinium chloride. The acid salts are selected from the class consisting of the hydrochloride, hydrobromide, hydriodide, phosphate and citrate.

It has now been found that the addition of an organic dye such as those described above to the basal oleandomycin medium results in the production of substantial potency increases, an effect that has been repeatedly reproduced. Thus, the application of this invention offers a new and useful method for improving the process for the production of oleandomycin. The process for the production of oleandomycin described herein comprises cultivating under submerged aerobic conditions a strain of *S. antibioticus* in an aqueous nutrient medium containing the organic dye until substantial antibacterial activity is imparted to said medium. In particular, this process comprises adding the dye to the fermentation medium, inoculating the medium with a culture of *S. antibioticus* and permitting growth of this microorganism until a commercially useful quantity of oleandomycin is thereby produced. Only a small amount of such dye need be present in the fermentation medium, generally in the concentration range of from about 0.005 g. to 2.00 g. per liter. The dye may be added either initially or sometime after fermentation has commenced. In general, it is most desirable to add the dye to the medium within 30 hours of initiation of the fermentation.

The fermentation broth must have present in it an organic dye selected from the class of acid salts of the organic bases described herein. For this purpose, it is desirable that there be present at least 0.005 g. of dye per liter in the fermentation medium. In particular, the preferred acid salt of this series is the hydrochloride. These hydrochlorides are chosen from the group consisting of 2,8-di(dimethylamino) acridine hydrochloride (Acridine Orange), 2,8-di-(dimethylamino) xanthydrol hydrochloride (Pyronine G), and a mixture comprising the hydrochlorides of 2,8-diaminoacridine and 2,8-diamino-10-methylacridinium chloride (Acriflavine); they are all found to be extremely valuable for use in the process of this invention.

The cultivation of the microorganism *S. antibioticus* preferably takes place in aqueous nutrient media under submerged conditions of agitation and aeration. Nutrient media which are useful for this process include a carbohydrate, such as sugars, starch, glycerol, and corn meal; a source of organic nitrogen, such as casein, soybean meal, wheat gluten, cottonseed meal, lactalbumin and tryptone; a source of growth substances, such as distillers' solubles, yeast extract, molasses fermentation residues, as well as mineral salts, such as sodium chloride, potassium phosphate, sodium nitrate, magnesium sulfate; trace minerals, such as copper, zinc and iron may also be utilized with desirable results. If excess foaming is encountered during the fermentation, anti-foaming agents, such as vegetable oils, may be added to the fermentation medium. During the fermentation, the pH of the medium tends to remain rather constant in the range of pH 5.5 to 8.0, but to prevent any variations that may occur, calcium carbonate is added to the medium. For optimum results, the pH is preferably maintained in the range of approximately 6.4 to 6.8.

For large scale commercial production, agitation may be maintained throughout the fermentation by means of suitable types of agitators generally familiar to those in the fermentation industry. Aeration of this medium in stainless steel tanks is maintained at the rate of one-half to two volumes of free air per volume of broth per minute. Aseptic conditions must, of course, be maintained throughout the transfer of the inoculum and throughout the growth of the microorganism. The highest yields are obtained in stainless steel fermentors. The cultivation of the microorganism *S. antibioticus* preferably takes place at a temperature in the range of 24 to 30° C. In general, the fermentation process is most satisfactorily conducted for a time period of from about one to five days.

Inoculum for the preparation of oleandomycin by the growth of *S. antibioticus* may be obtained by employing growth from slants on such media as Emerson's agar or beef lactose. The growth may be used to inoculate either shaken flasks or inoculum tanks for submerged growth, or the inoculum tanks may be seeded from the shaken flasks. The growth of the microorganism usually reaches its maximum in about two or three days. However, variations in the equipment used as well as the rate of aeration and agitation may affect the speed with which maximum activity is attained.

Some of the typical results obtained by the use of process of this invention are summarized in Table I wherein Acridine Orange is the dye employed:

TABLE I.—EFFECT OF ACRIDINE ORANGE IN THE ELABORATION OF OLEANDOMYCIN

| Acridine Orange, g./l.: | Oleandomycin, $\gamma$/ml. |
|---|---|
| None (control) | 255 |
| 0.010 | 345 |
| 0.025 | 360 |
| 0.030 | 450 |
| 0.050 | 400 |

Hence, the effect produced by the addition of Acridine Orange dye to the S. antibioticus fermentation medium with regard to the elaboration of oleandomycin is readily demonstrated.

This invention is further illustrated by the following examples which are not to be considered as imposing any limitation thereon.

*Example 1*

A slant of S. antibioticus ATCC 11891 was cultivated on agar under controlled conditions in order to develop spores for the purpose of inoculating a nutrient medium having the following composition:

| | Grams |
|---|---|
| Cerelose (dextrose hydrate) | 20 |
| Soybean meal | 15 |
| Distillers' solubles | 5 |
| Corn meal | 10 |

Tap water, in sufficient amount for a 1000 ml. solution, adjusted to pH 7.0–7.2 with potassium hydroxide.

After the pH had been adjusted, 5 g. of calcium carbonate was added. This inoculum medium was then subjected to heat sterilization. The medium was then cooled and ml. of a spore suspension of an oleandomycin-producing strain of S. antibioticus was added under aseptic conditions. The cultivation of the organism was conducted in shaken flasks at 28° C. for a period of 48 hours. The mixture of broth and mycelium thus formed was then transferred under aseptic conditions to a 3 liter fermentor containing 2000 ml. of a sterile fermentation medium having the following composition:

| | Grams |
|---|---|
| Cerelose (dextrose hydrate) | 60 |
| Soybean meal | 18 |
| Distillers' solubles | 5 |
| Corn meal | 12 |

Tap water in sufficient amount for a 1000 ml. total volume, adjusted to pH 7.0–7.2 with potassium hydroxide.

After the pH had been adjusted, 5 g. of calcium carbonate ml. of soybean oil antifoam and 0.020 g. of Acridine Orange dye were added. The mixture was then autoclaved at 20 lbs. per sq. in. (250° F.) for 15 minutes in order to sterilize the contents, before transferring the broth and mycelium thereto. After seeding the nutrient medium with the preformed inoculum previously described, the mixture was subjected to agitation and aeration under aseptic conditions for 72 hours; at 27–28° C. for the first 24 hours, then at 25–26° C. for the next 48 hours; during this period, the pH was in the range of 6.4 to 6.8. Aeration was accomplished by cultivation under submerged conditions at an air flow rate of one volume of air per volume of medium per minute. After termination of the process, the mycelium was removed by filtration and the filtered broth found to contain 450$\gamma$ of oleandomycin per ml. of solution. This represented a 1.8-fold increase over the control value (255$\gamma$/ml.) obtained by the same process wherein the Acridine Orange dye is absent.

*Example II*

Similar runs were made under the same conditions as those described for Example I except that the concentration of Acridine Orange dye was varied in each case within the range of 0.005 to 0.060 g. per liter. Some typical results obtained are reported in Table I. Thus, 0.050 g. of Acridine Orange dye per liter of fermentation medium afforded an oleandomycin potency of 400$\gamma$/ml., while 0.025 g. of the same dye yielded an oleandomycin potency of 360$\gamma$/ml.

*Example III*

The same procedure as described in Example I was followed here except that Pyronine G was the dye employed; in a similar manner, Acriflavine was the dye used. In both cases, it was found that a substantial increase in the amount of oleandomycin elaborated was obtained over that of the control value; in general, the order of magnitude of this increase parallels the results obtained in Example I.

*Example IV*

The same procedure as described in Example I, II and III was followed here except that various acid salts of the organic bases described herein were used in place of the hydrochlorides. For example, the hydrobromide, hydriodide, phosphate and citrate of 2,8-di(dimethylamino) acridine, 2,8-di(dimethylamino) xanthydrol, and a mixture comprising 2,8-diaminoacridine and 2,8-diamino-10-methylacridinium chloride, respectively, were all employed, and the results obtained were in substantial agreement with the data previously accumulated.

What is claimed is:

1. In a process for the production of oleandomycin by fermenting a nutrient medium with a culture of Streptomyces antibioticus, the improvement which comprises adding to the medium within 30 hours of initiation of the fermentation an organic dye chosen from the group consisting of the acid salts of 2,8-di(dimethylamino) acridine, the acid salts of 2,8-di(dimethylamino) xanthydrol, and a mixture comprising the acid salts of 2,8-diaminoacridine and 2,8-diamino-10-methylacridinium chloride.

2. A process as claimed in claim 1 wherein the acid salts are selected from the class consisting of the hydrochloride, hydrobromide, hydriodide, phosphate and citrate.

3. A process as claimed in claim 1 wherein the organic dye is an acid salt of 2,8-di(dimethylamino) acridine.

4. A process as claimed in claim 1 wherein the organic dye is an acid salt of 2,8-di(dimethylamino) xanthydrol.

5. A process as claimed in claim 1 wherein the organic dye is a mixture comprising the acid salts of 2,8-diaminoacridine and 2,8-diamino-10-methylacridinium chloride.

6. A process as claimed in claim 1 wherein the said dye is present in the concentration range of from about 0.005 g. to 2.000 g. per liter of fermentation medium and the process is conducted in the pH range of 5.5 to 8.0 at a temperature in the range of 24 to 30° C. for a time period of from about one to five days.

References Cited in the file of this patent

UNITED STATES PATENTS 2,757,123 Sobin et al. _____ July 31, 1956

OTHER REFERENCES

Porter: Bacterial Chemistry and Physiology, 1946, John Wiley & Sons, Inc., page 328.